United States Patent [19]
Cachia

[11] 4,193,613
[45] Mar. 18, 1980

[54] MOTORIZED PASSIVE SEAT BELT SYSTEM

[75] Inventor: Joseph M. Cachia, Knoxville, Tenn.

[73] Assignee: Allied Chemical Corporation, Morris Township, Morris County, N.J.

[21] Appl. No.: 838,800

[22] Filed: Sep. 28, 1977

[51] Int. Cl.² ............................................. B60R 21/02
[52] U.S. Cl. .................................................. 280/804
[58] Field of Search ....................... 280/744, 745, 747; 180/82 C; 297/388, 389; 74/15.2, 11, 15.63

[56] References Cited

U.S. PATENT DOCUMENTS

| | | | |
|---|---|---|---|
| 3,770,078 | 11/1973 | Keppel | 280/745 X |
| 3,815,934 | 6/1974 | Weststrate | 280/745 |
| 3,833,239 | 9/1974 | Coenen | 280/745 |
| 3,860,260 | 1/1975 | Kazaoka et al. | 280/745 |
| 4,004,829 | 1/1977 | Kato et al. | 280/745 |
| 4,029,339 | 6/1977 | Kaneko et al. | 280/745 |
| 4,072,323 | 2/1978 | Shimokawa et al. | 280/745 |

Primary Examiner—Robert B. Reeves
Assistant Examiner—Gene A. Church
Attorney, Agent, or Firm—Roger H. Criss

[57] ABSTRACT

A passive seat belt system including a cable attached to the seat belt for moving the seat belt to a non-interfering position and a winding device for moving the cable. The winding device is drivingly connected to an electric motor for movement of a device unassociated with the passive seat belt when the door is open. A single motor operates the passive seat belt system of both the driver's and right front passenger positions through a gearbox arrangement which is also connected to the windshield wiper or other motor.

8 Claims, 2 Drawing Figures

MOTORIZED PASSIVE SEAT BELT SYSTEM

BACKGROUND OF THE INVENTION

1. Field of the Invention

This invention relates to passive seat belt systems, especially such systems which include driving motors.

2. Description of the Prior Art

Passive seat belt systems have been suggested in which the seat belt is automatically positioned about a vehicle occupant before the vehicle is operated, e.g., after the door is closed. Such proposed systems include mechanical devices as well as motorized electrical devices. Examples of the latter are those disclosed, for example, in the following U.S. Pat. Nos.: 4,029,339; 4,004,829; 3,860,260; 3,833,239; 3,815,934; and 3,770,078.

One problem associated with such previously suggested motorized passive seat belt systems is that they require an additional motor in the vehicle which adds to the weight and displaces valuable space within the vehicle.

SUMMARY OF THE INVENTION

In accordance with this invention, there is provided in a vehicle passive restraint system for automatically positioning a seat belt about a vehicle occupant and a motor for movement of a device unassociated with the passive restraint system, the improvement comprising:

winding means from moving the seat belt to a first, non-interfering position upon the opening of the door of the vehicle so as to permit free ingress to an egress from the vehicle by the occupant, the seat belt being movable to a second, occupant-restraining position upon closing of the door; and means drivingly connecting the motor and the winding means when the door is opened.

Accordingly, this invention utilizes an existing motor in the vehicle to provide the mechanized drive for the passive restraint system. For example, such motor may be the windshield wiper motor, the heater/air conditioning fan motor or similar motors. A gear box arrangement is preferably provided to drive the desired mechanism upon actuation of various switches. Also, the motor preferably provides the drive mechanism for both the driver and passenger seat positions. By utilizing an existing vehicle motor, considerable space and weight are saved.

DESCRIPTION OF THE PREFERRED EMBODIMENTS

Figure 1:
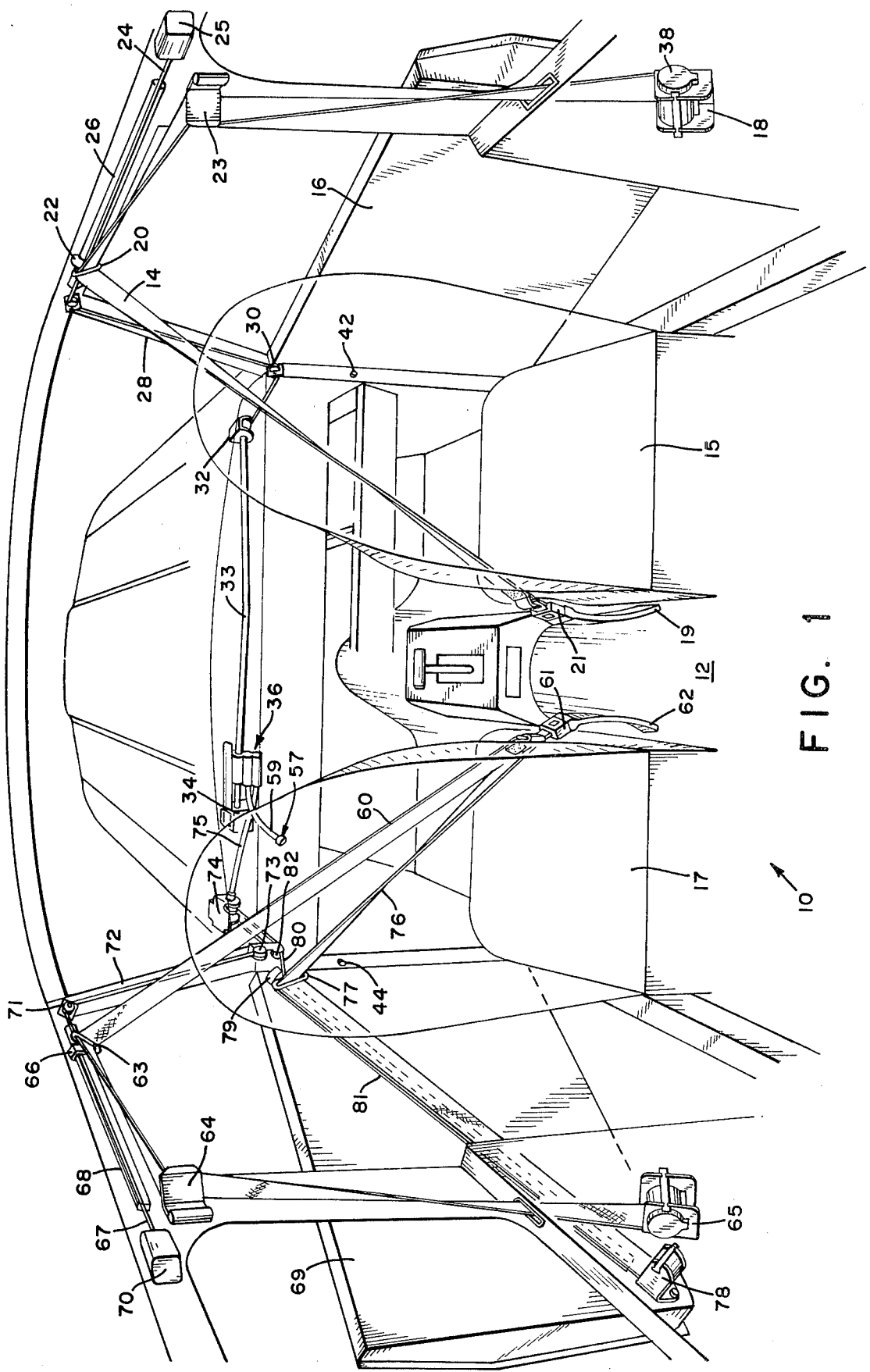
FIG. 1 is a perspective view of the passive seat belt system of this invention.

With reference to FIG. 1, the passive seat belt system of this invention, generally indicated by 10 in vehicle 12, includes a seat belt which is adapted to encircle an occupant upon closing of a door. Seat belt 14 for passenger seat 15 may comprise a single diagonal belt as shown or lap and shoulder belts or portions of belts. As is conventional, one end of the belt is connected to a retractor 18 which may be mounted on a pillar, door or other location. Retractor 18 may be of the inertia locking type as is generally known. The other end of belt 14 is connected to a portion of the vehicle structure at 19 optionally through an emergency release buckle 21. Seat belt 14 passes through a stationary D-ring 23 and through movable D-ring 20 which has a mounting plate 22 attached to a cable 24 located, for example, in a track 26 within the roof and above the door. Movement of cable 24 causes respective movement of D-ring 20 and hence belt 14. A cable actuated seat belt system which is mechanically actuated is shown in copending U.S. patent application Ser. No. 818,800 filed July 25, 1977, the disclosure of which is expressly incorporated herein by reference.

Cable 24 is mounted within a track or tube 26 which extends above the door 16 and through or adjacent to the windshield pillar 28 and to a guide roller(s) 30, which is mounted within the dashboard. Instead of a guide roller, a pulley arrangement may be utilized. Cable 24 extends past roller 30 to a conventional windup drum 32. The other end of cable 24 is connected to the vehicle at 25, e.g. through a rewind drum (not shown). Windup drum 32 is mounted in the engine compartment and is connected through drive 33 to an existing electrical motor; in the embodiment depicted, this is windshield wiper motor 34. However, any existing electrical motor in the vehicle may be utilized, such as the fan motor for the heater/air conditioner, electric fuel pump motor, etc. Windup drum 32 is drivingly connected to motor 34 through drive 33 and a solenoid-actuated gear box 36. Motor 34 is electrically connected to the vehicle battery 35.

The passive seat belt system shown for the driver's seat 17 includes a shoulder belt 60 having one end connected to vehicle 12 at 61 through an optional emergency release buckle 62. Belt 60 passes through movable D-ring 63 and through stationary D-ring 64 to inertia locking retractor 65. Movable D-ring 63 has its mounting plate 66 attached to cable 67 located in track 68 within the vehicle roof and above door 69. One end of cable 67 is attached to vehicle 12 at 70 and the other end passes through guide roller 71 mounted in pillar 72, thence through guide roller 73 mounted in the dashboard and thence to windup drum 74 mounted in the engine compartment. Drum 74 is connected by drive 75 to motor 34. Lap belt 76 of seat 17 is commonly joined at one end with shoulder belt 60. Lap belt 76 passes through movable D-ring 77 and has its other end connected to retractor 78, which may, for example, be an automatic locking retractor. Movable D-ring 77 is attached through mounting plate 79 to cable 80 located in track 81 on door 69. Cable 79 passes through guide roller 82 mounted in pillar 72 to a rewind drum commonly housed with drum 74.

Included in the door jam of doors 16 and 69 are switches 42 and 44 which sense the opening and closing of the doors. Any conventional switch, such as a microswitch, may be utilized for this purpose.

Figure 2:
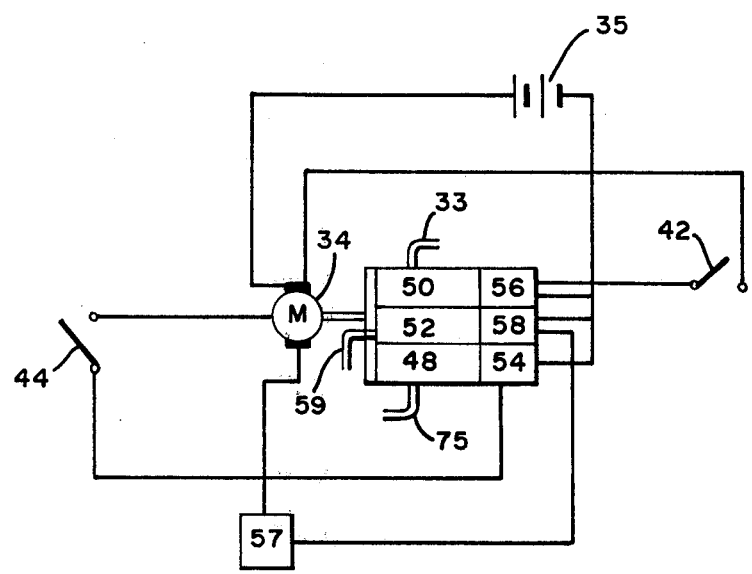
FIG. 2 is an electrical schematic of the passive seat belt system of this invention.

Gear box 36 includes (as schematically shown in FIG. 2) gears 48, 50 and 52 and solenoids 54, 56 and 58 associated therewith respectively. Gears 48, 50 and 52 are connected to drives 75, 33 and 59 respectively. Solenoid 54 and motor 34 are electrically connected to switch 44. Solenoid 56 and motor 34 are electrically connected to switch 42. Solenoid 58 and motor 34 are electrically connected to a conventional windshield wiper actuator 57 located in the passenger's side of the fire wall through drive 59. Solenoids 54, 56 and 58 are also electrically connected to battery 35.

In operation, when door 16 is opened, switch 42 is closed thereby actuating solenoid 56 and motor 34. Winding drum 32 is driven by motor 34 in a first windup direction which winds cable 24 and moves seat belt 14 from its initial position to a first, forward, non-interfering position which permits free ingress to and egress from the vehicle. When the belt has been moved to the desired position, a limit switch associated with windup drum 32 (not shown) prevents further windup rotation of drum 32 and shuts off motor 34 but does not deactivate solenoid 56. When the occupant moves into seated position in the vehicle and closes door 16, switch 42 is opened, thereby opening the circuit with solenoid 56 and deactivating the solenoid and permitting motion of the cable 24 in a direction away from drum 32. Preferably, this extending motion is achieved by means of the force of a windup spring 38 associated with retractor 18, which spring is strong enough to move the webbing rearward and hence move the D-ring 20 rearward to a second position at which the belt is positioned in a restraining position about the occupant. For this purpose, belt 14 may be provided with a button or similar engaging device such as is described in the aforementioned U.S. patent application. Alternatively, motor 34 may be a reversible motor and connected to windup drum 32 to rotate the same in a cable extending direction when switch 42 is closed and until belt 14 is returned to its initial position at which time solenoid 56 and motor 34 are turned off by a separate limit switch.

It should be appreciated that switch 44 actuates motor 34 and solenoid 54 in a manner similar to the action of switch 42 upon the opening and closing of door 69. In this case, shoulder belt 60 and lap belt 76 are moved to their forward position upon winding rotation of drum 74 through the motion of cables 67 and 79 respectively, and are moved to their rearward position by the force of the rewind springs of the associated retractors or by rotation of drum 74 in the opposite direction by motor 34. Also, it should be appreciated that the actuation of the windshield wiper gear through dash mounted actuator 57 or the like activates the movement of the wipers through solenoid 58 and motor 34 in the usual manner, without affecting movement of the belts. Similarly, movement of the belts does not affect operation of the windshield wipers.

It is to be understood that the specific arrangement of the passive seat belts, retractors and associated hardware shown is for purposes of illustration only and that any suitable arrangement thereof may be utilized. By providing a motorized passive restraint system wherein an existing motor is employed, only minor electrical and mechanical components need be added, such as a conventional gear box, solenoids and drives. Thus, the weight and cost of an additional motor have been eliminated as well as the necessity to house such motor in the passenger's compartment.

It is further to be understood that variations and modifications of the present invention may be made without departing from the scope thereof. It is also to be understood that the present invention is not to be limited by the specific embodiments disclosed herein but only in accordance with the appended claims when read in light of the foregoing specification.

I claim:

1. In a vehicle passive restraint system for automatically positioning a seat belt about a vehicle occupant and a motor for movement of a device unassociated with said passive restraint system, the improvement comprising:
    winding means for moving said belt to a first, noninterfering position upon the opening of a door of the vehicle so as to permit free ingress to and egress from said vehicle by said occupant, said seat belt being movable to a second, occupant restraining position upon closing of said door;
    means drivingly connecting said motor and said winding means when said door is opened;
    switch means responsive to the opening and closing of said door, said switch means being electrically connected to said motor means; and
    said drivingly connected means including a gear box associated with said motor and including separate solenoids for each of said winding means and a solenoid for said unassociated device, said solenoid for said winding means being electrically connected to said winding means and said switch means and said solenoid for said device being electrically connected to said device, and wherein each of said solenoids is electrically connected to said motor means.

2. The passive seat belt system of claim 1 wherein said motor means is reversible, said motor and winding means being drivingly connected when said door is closed to thereby move said seat belt to said second position.

3. The passive seat belt system of claim 1 including cable means connected to said seat belt and said winding means and capable of being wound up on said winding means to move said seat belt.

4. The passive seat belt system of claim 3 wherein said cable means is connected to said seat belt through a D-ring fixedly attached to said cable means and through which said seat belt moves.

5. The passive seat belt system of claim 1 wherein said motor means comprises a windshield wiper motor.

6. The passive seat belt system of claim 1 including separate winding means for the driver's and front passenger's seats.

7. The passive seat belt system of claim 1 wherein said seat belt is movable to said second position due to the force of a rewind spring associated with a retractor for said seat belt.

8. The passive seat belt system of claim 1 including separate winding means associated with the seat belts for separate seats of said vehicle and wherein each of said winding means is drivingly connected to said motor.

* * * * *